US012794590B2

(12) United States Patent
Xiong et al.

(10) Patent No.: US 12,794,590 B2
(45) Date of Patent: Nov. 10, 2026

(54) ENHANCED PHYSICAL UPLINK SHARED CHANNEL REPETITION FOR HALF DUPLEX FREQUENCY DIVISION DUPLEX WIRELESS OPERATIONS

(71) Applicant: INTEL CORPORATION, Santa Clara, CA (US)

(72) Inventors: Gang Xiong, Portland, OR (US); Yingyang Li, Beijing (CN); Debdeep Chatterjee, San Jose, CA (US); Sergey Sosnin, Zavolzhie (RU); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 18/575,838

(22) PCT Filed: Nov. 2, 2022

(86) PCT No.: PCT/US2022/048702
§ 371 (c)(1),
(2) Date: Dec. 30, 2023

(87) PCT Pub. No.: WO2023/081211
PCT Pub. Date: May 11, 2023

(65) Prior Publication Data

US 2024/0322947 A1 Sep. 26, 2024

Related U.S. Application Data

(60) Provisional application No. 63/315,315, filed on Mar. 1, 2022, provisional application No. 63/303,872, filed
(Continued)

(51) Int. Cl.
*H04L 12/28* (2006.01)
*H04L 1/08* (2006.01)
*H04L 5/14* (2006.01)

(52) U.S. Cl.
CPC . *H04L 1/08* (2013.01); *H04L 5/14* (2013.01)

(58) Field of Classification Search
CPC ................ H04L 1/08; H04L 5/14; H04L 5/16
See application file for complete search history.

(56) References Cited

U.S. PATENT DOCUMENTS 12,452,880 B2 * 10/2025 Karaki .............. H04W 72/0446
2021/0022158 A1 * 1/2021 Wei ........................... H04L 1/08
2021/0051669 A1 * 2/2021 Lin ....................... H04W 72/53
2022/0231899 A1 * 7/2022 Khoshnevisan .... H04L 27/0014
(Continued)

FOREIGN PATENT DOCUMENTS

KR 1020170062492 A 6/2017
WO WO-2021020955 A1 * 2/2021 ............ H04W 72/23

OTHER PUBLICATIONS

International Search Report and Written Opinion mailed Mar. 10, 2023 in Application No. PCT/US2022/048702, 11 pages.
(Continued)

*Primary Examiner* — Elisabeth Benoit Magloire
(74) *Attorney, Agent, or Firm* — Gray Ice Higdon, PLLC

(57) ABSTRACT

This disclosure describes systems, methods, and devices for physical uplink shared channel (PUSCH) repetition for half duplex frequency division duplex (HD-FDD) wireless operations. A user equipment (UE) device may detect a use of HD-FDD operations; identify an available time slot during which to transmit a PUSCH repetition for the HD-FDD operations; and encode the PUSCH repetition to be transmitted during the available time slot.

20 Claims, 5 Drawing Sheets

Related U.S. Application Data on Jan. 27, 2022, provisional application No. 63/287,185, filed on Dec. 8, 2021, provisional application No. 63/275,366, filed on Nov. 3, 2021.

(56) References Cited

U.S. PATENT DOCUMENTS

| | | | | |
|---|---|---|---|---|
| 2022/0321269 | A1* | 10/2022 | Nhan | H04L 1/189 |
| 2022/0322336 | A1* | 10/2022 | Sridharan | H04L 5/0055 |
| 2022/0322337 | A1* | 10/2022 | Sridharan | H04L 1/1861 |
| 2023/0146487 | A1* | 5/2023 | Chien | H04W 72/23 |
| 2023/0232380 | A1* | 7/2023 | Bhamri | H04L 1/08<br>370/329 |
| 2023/0309110 | A1* | 9/2023 | Khoshnevisan | H04B 1/715 |
| 2023/0354314 | A1* | 11/2023 | Ma | H04L 5/0053 |
| 2024/0031010 | A1* | 1/2024 | Ye | H04L 5/0091 |

OTHER PUBLICATIONS

3GPP TSG RAN WG1 #106bis-e, "Discussion on enhancement on PUSCH repetition type A," Vivo, R1-2108989, Oct. 11-19, 2021, 7 pages.

3GPP TSG-RAN WG1 Meeting #106-e, "Summary on the physical layer aspects of small data transmission," Moderator (ZTE), R1-2108561, Aug. 16-27, 2021, 46 pages.

3GPP TSG RAN WG1 #106-e, "FL summary #2 of TB processing over multi-slot PUSCH (AI 8.8.1.2)," Moderator (Nokia, Nokia Shanghai Bell), R1-2108544, Aug. 16-27, 2021, 149 pages.

3GPP TSG-RAN WG1 Meeting #101-e, "Summary of [101-e-NR-L1enh-URLLC-PUSCH-01] (AI 7.2.5.3)," Moderator (Apple Inc.), R1-2004739, May 25-Jun. 5, 2020, 30 pages.

International Preliminary Report on Patentability mailed May 16, 2024 in Application No. PCT/US2022/048702, 7 pages.

* cited by examiner

ENHANCED PHYSICAL UPLINK SHARED CHANNEL REPETITION FOR HALF DUPLEX FREQUENCY DIVISION DUPLEX WIRELESS OPERATIONS

CROSS-REFERENCE TO RELATED PATENT APPLICATION(S)

This application is a U.S. National Stage Application under 35 U.S.C. 371 and claims the priority benefit of International Application No. PCT/US2022/048702, filed Nov. 2, 2022, which claims the benefit of U.S. Provisional Application No. 63/275,366, filed Nov. 3, 2021, U.S. Provisional Application No. 63/287,185, filed Dec. 8, 2021, U.S. Provisional Application No. 63/303,872, filed Jan. 27, 2022, and U.S. Provisional Application No. 63/315,315, filed Mar. 1, 2022, the disclosures of which are incorporated by reference as set forth in full.

TECHNICAL FIELD

This disclosure generally relates to systems and methods for wireless communications and, more particularly, to physical uplink shared channel (PUSCH) repetition for half duplex frequency division duplex (HD-FDD) wireless operations.

BACKGROUND

Wireless devices are becoming widely prevalent and are increasingly using wireless channels. The 3rd Generation Partnership Program (3GPP) is developing one or more standards for wireless communications.

DETAILED DESCRIPTION

Figure 1:
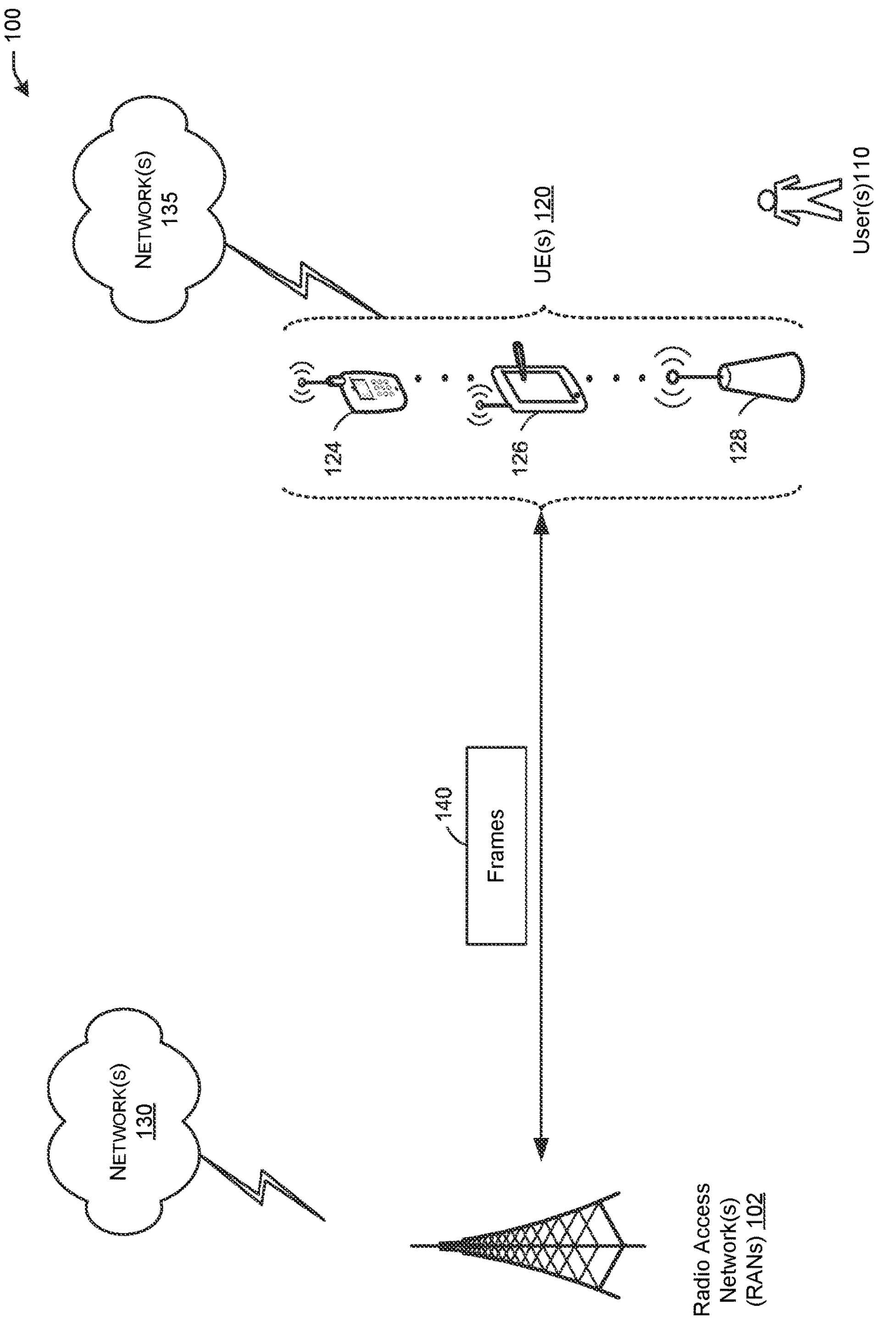
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may operate as defined by technical standards. For cellular telecommunications, the 3rd Generation Partnership Program (3GPP) define communication techniques, including the use of physical uplink shared channel (PUSCH) as a shared control channel carrying both signaling and user data, and uplink control information (UCI), and defining half duplex frequency division duplex (HD-FDD) operations for wireless communications.

In HD-FDD operations, a user equipment device (UE) may conserve power by turning off a transmitter or receiver when not being used, meaning that there may not be simultaneous uplink and downlink transmission with the network.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

For cellular systems, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

For NR, two types of configured grant—physical uplink shared channel (CG-PUSCH) transmission—are specified. In particular, for a Type 1 CG-PUSCH transmission, UL data transmission is only based on radio resource control (RRC) (re)configuration without any layer 1 (L1) signaling. In particular, a semi-static resource may be configured for one UE, which includes a time and frequency resource, modulation and coding scheme, reference signal, etc. For a Type 2 CG-PUSCH transmission, UL data transmission is based on both RRC configuration and L1 signaling to activate/deactivate UL data transmission.

For PUSCH repetition type A, counting based on available slots (e.g., time slots) is supported, where the procedure consists of two steps: Step 1: Determine available slots for K repetitions based on radio resource control (RRC) configuration(s) in addition to time domain resource allocation (TDRA) in the downlink control information (DCI) scheduling the PUSCH, CG configuration or activation downlink control information (DCI). Step 2: The UE determines whether to drop a PUSCH repetition or not according to Rel-15/16 PUSCH dropping rules, but the PUSCH repetition is still counted in the K repetitions.

In the first step, parameters tdd-UL-DL-Configuration-Common, tdd-UL-DL-ConfigurationDedicated and ssb-PositionsInBurst are considered for the determination of available slots. In particular, UE determines a slot as an available slot when PUSCH repetition does not overlap with semi-statically configured DL symbols and flexible symbols used for a synchronization signal block (SSB) transmission.

In Rel-17, a class of Reduced Capability (RedCap) NR UEs may be defined that can be served using the currently specified 5G NR framework with necessary adaptations and enhancements to limit device complexity and power consumption. For frequency division multiplexing (FDD) bands, a further complexity reduction feature is support of half duplex—FDD (HD-FDD) that allows to replace a duplexer with a switch, that helps reduce cost as well as insertion loss due to the duplexer.

However, a HD-FDD UE will not be able to receive and transmit simultaneously in the DL and UL carriers. In this case, it would be necessary to address scenarios involving time-overlaps between DL reception and UL transmission, especially when considering the case when PUSCH repetition is counted based on available slots as mentioned above.

The present disclosure defines systems and methods for PUSCH repetition on an available slot for half-duplex FDD operations in a NR system. In particular, the present disclosure proposes use of PUSCH repetition type A with counting based on available slot for HD-FDD operations, and mechanisms on small data transmission (SDT) for HD-FDD operations.

In one or more embodiments, for HD-FDD operations, the available slot for PUSCH repetition type A can be determined differently for dynamic grant uplink transmissions and configured grant uplink transmissions. In one aspect, when a dynamic grant uplink transmission including PUSCH and PUCCH repetition overlaps with SSB symbols, and if dynamic grant uplink transmission with repetition is prioritized over SSB, in this case, ssb-PositionsInBurst is not used for the determination of available slot. In particular, all slots are treated as available slot for PUSCH repetition type A.

In one or more embodiments, when a configured grant uplink transmission including PUSCH and PUCCH repetition overlaps with SSB symbols, and if SSB is prioritized over configured grant uplink transmission with repetition, in this case, ssb-PositionsInBurst is considered for the determination of available slot. In particular, UE determines a slot as unavailable slot when PUSCH repetition overlaps with a SSB symbol indicated by ssb-PositionsInBurst.

In one or more embodiments, in another option, in the first step of determination of available slots for both DG-PUSCH and CG-PUSCH, the same mechanisms as defined for FDD are applied for HD-FDD, where all slots are considered as available slots for PUSCH repetition with counting based on available slots.

In one or more embodiments, in another option, in the first step of determination of available slots for both DG-PUSCH and CG-PUSCH, only SSB indicated by ssb-PositionsInBurst is used to determine whether the slot is available or not. In particular, UE determines a slot as unavailable slot when PUSCH repetition overlaps with a SSB symbol indicated by ssb-PositionsInBurst.

In one or more embodiments, given that a HD-FDD UE is not expected to transmit in the uplink earlier than $N_{RX\text{-}TX}$ Tc after the end of the last received downlink symbol in the same cell, this may indicate that this collision handling rule may be used in the second step of counting based on available slot for PUSCH repetition type A. In other words, for HD-FDD UE, when the gap between the end of last received downlink symbol and the start of transmission of PUSCH repetition is less than $N_{RX\text{-}TX}$ Tc, UE considers the slot as unavailable for mapping a PUSCH repetition.

In one or more embodiments, Tc may be defined as a time unit $$T_c = \frac{1}{(\Delta f_{max} \cdot N_f)},$$

where $\Delta f_{max}$ maybe $480\times10^3$ Hz and $N_f$=4096.

In one or more embodiments, assuming that a HD-FDD UE can be scheduled or configured to transmit in the uplink earlier than $N_{RX\text{-}TX}$ Tc after the end of the last received downlink symbol in the same cell, this may indicate that this collision handling rule may be used in the second step of counting based on available slot for PUSCH repetition type A. In other words, for HD-FDD UE, when the gap between the end of last received downlink symbol and the start of transmission of PUSCH repetition is less than $N_{RX\text{-}TX}$ Tc, UE considers the slot as unavailable for mapping a PUSCH repetition.

In one or more embodiments, assuming that a HD-FDD UE can be scheduled or configured to transmit in the uplink earlier than $N_{RX\text{-}TX}$ Tc after the end of the last received downlink symbol in the same cell, this collision handling rule may be used in the first step of counting based on available slot for PUSCH repetition type A. In one aspect, for HD-FDD UE, when the gap between the end of last received downlink symbol and the start of transmission of dynamic grant PUSCH repetition is less than $N_{RX\text{-}TX}$ Tc, if dynamic grant uplink transmission with repetition is prioritized over SSB, UE determines a slot as available slot in the first step of PUSCH repetition when counting based on available slots.

In one or more embodiments, for HD-FDD UE, when the gap between the end of last received downlink symbol and the start of transmission of configured grant PUSCH repetition is less than $N_{RX\text{-}TX}$ Tc, if SSB is prioritized over configured grant uplink transmission with repetition, UE determines a slot as unavailable slot in the first step of PUSCH repetition when counting based on available slots.

The above embodiments can also be applied for transport block (TB) processing over multiple slots on PUSCH and Msg3 PUSCH repetition, which includes Msg3 initial transmission and retransmission. This is since both TB processing over multiple slots over PUSCH and Msg3 PUSCH repetition, the repetitions are counted based on available slots.

In one or more embodiments, for TB processing over multiple slots with and without repetitions, in case of HD-FDD RedCap UEs, a slot is not counted as the available slots if at least one of the symbols indicated by the indexed row of the used resource allocation table in the slot overlaps a symbol of an SS/PBCH block with index provided by ssb-PositionsInBurst.

In one or more embodiments, the updated specification in Section 6.1.2.3.3 in 3GPP TS38.214 is as follows:

If the UE determines that, for a transmission occasion, the number of symbols available in a slot for the PUSCH transmission of TB processing over multiple slots is smaller than transmission duration L, the UE does not transmit the PUSCH in the transmission occasion.

For Type 2 PUSCH transmission with a configured grant of TB processing over multiple slots, For unpaired spectrum:

The UE shall transmit the TB across the N·K slots determined for the PUSCH transmission applying the same symbol allocation in each slot. A slot is not counted in the number of N·K slots if at least one of the symbols indicated by the indexed row of the used resource allocation table in the slot overlaps with a DL symbol indicated by tdd-UL-DL-Configuration-Common or tdd-UL-DL-ConfigurationDedicated if provided, or a symbol of an SS/PBCH block with index provided by ssb-PositionsInBurst.

For paired spectrum and SUL band:

The UE shall transmit the TB across the N·K consecutive slots applying the same symbol allocation in each slot.

For the case of a reduced capability half-duplex UE, the UE shall transmit the TB across the N·K slots determined for the PUSCH transmission applying the same symbol allocation in each slot. A slot is not counted in the number of N·K slots if at least one of the symbols indicated by the indexed row of the used resource allocation table in the slot overlaps a symbol of an SS/PBCH block with index provided by ssb-PositionsInBurst.

A Type 2 PUSCH transmission with a configured grant of TB processing over multiple slots is omitted in a slot according to the conditions in clause 9, clause 11.1 and clause 11.2A of [6, TS 38.213].

In one or more embodiments, for TB processing over multiple slots with and without repetitions, in case of HD-FDD RedCap UEs, a UE determines a slot as an available slot when a TBoMS transmission starts or ends at least $N_{RX-TX}$·Tc or N $N_{RX-TX}$ Tc, respectively, from the last or first symbol in the set of symbols with SSB transmission and does not overlap with SSB transmission.

The updated specification in Section 6.1.2.3.3 in 3GPP TS38.214 is as follows: If the UE determines that, for a transmission occasion, the number of symbols available in a slot for the PUSCH transmission of TB processing over multiple slots is smaller than transmission duration L, the UE does not transmit the PUSCH in the transmission occasion.

For Type 2 PUSCH transmission with a configured grant of TB processing over multiple slots, For unpaired spectrum:

The UE shall transmit the TB across the N·K slots determined for the PUSCH transmission applying the same symbol allocation in each slot. A slot is not counted in the number of N·K slots if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst.

For paired spectrum and SUL band:

The UE shall transmit the TB across the N·K consecutive slots applying the same symbol allocation in each slot.

For the case of a reduced capability half-duplex UE, the UE shall transmit the TB across the N·K slots determined for the PUSCH transmission applying the same symbol allocation in each slot. A slot is not counted in the number of N·K slots if at least one of the symbols indicated by the indexed row of the used resource allocation table in the slot overlaps a symbol of an SS/PBCH block with index provided by ssb-PositionsInBurst or if a last symbol or a first symbol indicated by the indexed row of the used resource allocation table in the slot would not be at least $N_{Tx-Rx}\cdot T_c$ [4, TS 38.211] prior to a first symbol of the next earliest SS/PBCH block or at least $N_{Tx-Rx}\cdot T_c$ [4, TS 38.211] after a last symbol of the previous latest SS/PBCH block with index provided by ssb-PositionsInBurst, respectively.

A Type 2 PUSCH transmission with a configured grant of TB processing over multiple slots is omitted in a slot according to the conditions in clause 9, clause 11.1 and clause 11.2A of [6, TS 38.213].

In one or more embodiments, for PUSCH repetition type A with counting based on available slots, in case of HD-FDD RedCap UEs, a UE determines a slot as an available slot when a PUSCH repetition starts or ends at least $N_{Rx-Tx}\cdot T_c$ or $N_{Rx-Tx}\cdot T_c$, respectively, from the last or first symbol in the set of symbols with SSB transmission and does not overlap with SSB transmission.

The updated specification for TBoMS and PUSCH repetition type A with dynamic grant (DG)-PUSCH in Section 6.1.2.1 in TS38.214 is as follows:

For paired spectrum and SUL band:

The UE determines N·K consecutive slots for a PUSCH transmission of a PUSCH repetition type A scheduled by DCI format 0_1 or 0_2, or for a PUSCH transmission of TB processing over multiple slots scheduled by DCI format 0_1 or 0_2, based on the TDRA information field value in the DCI format 0_1 or 0_2, irrespective of whether AvailableSlotCounting is enabled or not.

For the case of reduced capability half-duplex UE, and when AvailableSlotCounting is enabled, a slot is not counted in the number of N·K slots for a PUSCH transmission of a PUSCH repetition Type A scheduled by DCI format 0_1 or 0_2, or for a PUSCH transmission of TB processing over multiple slots scheduled by DCI format 0_1 or 0_2, if at least one of the symbols indicated by the indexed row of the used resource allocation table in the slot overlaps with a symbol of an SS/PBCH block with index provided by ssb-PositionsInBurst or if a last symbol or a first symbol indicated by the indexed row of the used resource allocation table in the slot would not be at least $N_{Tx-Rx}\cdot T_c$ [4, TS 38.211] prior to a first symbol of the next earliest SS/PBCH block or at least $N_{Tx-Rx}\cdot T_c$ [4, TS 38.211] after a last symbol of the previous latest SS/PBCH block with index provided by ssb-PositionsInBurst, respectively.

The UE determines N·K consecutive slots for a PUSCH transmission of a PUSCH repetition Type A scheduled by RAR UL grant, based on the TDRA information field value in the RAR UL grant.

The UE determines N·K consecutive slots for a PUSCH transmission of a PUSCH repetition Type A scheduled by DCI format 0_0 with CRC scrambled by TC-RNTI, based on the TDRA information field value in the DCI scheduling the PUSCH.

In addition, the updated specification for PUSCH repetition type A with configured grant (CG)-PUSCH in Section 6.1.2.3.1 in TS38.214 is as follows:

For both Type 1 and Type 2 PUSCH transmissions with a configured grant, when K>1, For unpaired spectrum:

If AvailableSlotCounting is enabled, the UE shall repeat the TB across the N·K slots determined for the PUSCH transmission applying the same symbol allocation in each slot.

A slot is not counted in the number of N·K slots if at least one of the symbols indicated by the indexed row of the used resource allocation table in the slot overlaps with a DL symbol indicated by tdd-UL-DL-ConfigurationCommon or tdd-UL-DL-ConfigurationDedicated if provided, or a symbol of an SS/PBCH block with index provided by ssb-PositionsInBurst.

Otherwise, the UE shall repeat the TB across the N·K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

For paired spectrum:

Irrespective of whether AvailableSlotCounting is enabled or not, the UE shall repeat the TB across the N·K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration.

If AvailableSlotCounting is enabled, and in case of reduced capability half-duplex UE, a slot is not counted in the number of N·K slots if at least one of the symbols indicated by the indexed row of the used resource allocation table in the slot overlaps with or a symbol of an SS/PBCH block with index provided by ssb-PositionsInBurst or if a last symbol or a first symbol indicated by the indexed row of the used resource allocation table in the slot would not be at least $N_{Tx\text{-}Rx} \cdot T_c$ [4, TS 38.211] prior to a first symbol of the next earliest SS/PBCH block or at least $N_{Tx\text{-}Rx} \cdot T_c$ [4, TS 38.211] after a last symbol of the previous latest SS/PBCH block with index provided by ssb-PositionsInBurst, respectively.

In one or more embodiments, for a RedCap UE indicating HD-FDD capability but configured with Type A PUSCH repetitions wherein the repetitions are counted based on all slots and PUSCH repetitions in unavailable slots are dropped, the HD-FDD RedCap UE may be expected to drop the PUSCH repetition in a slot identified as unavailable based on one or more of the above conditions disclosed above.

Mechanisms on small data transmission (SDT) for HD-FDD operations:

In Rel-17, small data transmission for UEs in RRC_INACTIVE mode was specified, with the motivation to reduce data transmission delay and save the UE power consumption. In particular, direct data transmission on PUSCH within configured grant was considered without associated PRACH preamble transmission. Further, for UEs in RRC_INACTIVE mode, small data transmission can be completed without moving into RRC_CONNECTED mode, thereby saving state transition signaling overhead.

Embodiments of mechanisms on small data transmission (SDT) for HD-FDD operations are provided as follows.

In one or more embodiments, the validation rule for CG-PUSCH during configured grant (CG) SDT operation for FDD can be applied for that for HD-FDD. In particular, for FDD, a CG PUSCH occasion is not valid if it overlaps with any valid physical Random Access Channel Occasion (RO). Then for HD-FDD, the same mechanism can be applied for CG-PUSCH validation in CG-SDT operation, i.e., a CG PUSCH occasion is not valid if it overlaps with any valid PRACH occasion.

Further, the mapping rule for SSB to CG-PUSCH resource defined for FDD as follows can also be applied for HD-FDD operation:

Each N of consecutive SSB indexes associated to one CG configuration are mapped to valid CG PUSCH resources first, in increasing order of DMRS resource indexes, where a DMRS resource index is determined first in an ascending order of a DMRS port index and second in an ascending order of a DMRS sequence index second, in increasing order of CG period indexes in the association period The mapping ratio N is explicitly signaled, and the association period is implicitly derived The SSB to CG PUSCH association period is the duration of multiple of CG periods depending the smallest time duration in the set determined by the CG period such that all SSBs associated with the CG configuration are mapped at least once to CG PUSCH resources.

In a further example, if a RedCap UE configured with CG-SDT, is configured with separate initial DL BWP with at least PDCCH Type 1 Common Search Space (CSS) and associated PDSCH mapped to it, the QCL reference is determined from the Non-Cell Defining-SSB (NCD-SSB) if an NCD-SSB is configured in the separate initial DL BWP, otherwise, the SSB detected as part of initial access (also referred to as "Cell Defining-SSB (CD-SSB)" is used. Note that while the above is applicable to RedCap UEs indicating support of HD-FDD, the example behavior may apply regardless of HD-FDD support.

In one or more embodiments, for FDD, a CG PUSCH occasion is not valid if it overlaps with MsgA PUSCH occasion. Similarly, this can be applied for CG-PUSCH validation for HD-FDD operations, i.e., a CG PUSCH occasion is not valid if it overlaps with MsgA PUSCH occasion.

In one or more embodiments, the validation rule for CG-PUSCH during CG-SDT operation for TDD can be applied for that for HD-FDD. In particular, the following validation rule can be applied for HD-FDD operation, with the exception that they apply to paired spectra, and that the considerations on tdd-UL-DL-ConfigurationCommon are not applicable. In a further example, Ngap=0 symbols may be applied for HD-FDD UEs in paired spectra.

For unpaired spectrum and for SS/PBCH blocks with indexes provided by ssb-PositionsInBurst in SIB1 or by ServingCellConfigCommon.

If a UE is provided tdd-UL-DL-ConfigurationCommon, the valid CG-PUSCH occasion is the CG-PUSCH occasion in UL part in a slot, or at least Ngap symbols after the end of the DL part in a slot or after the end of the SSB in a slot.

If a UE is not provided tdd-UL-DL-ConfigurationCommon, the valid CG-PUSCH occasion does not precede a SS/PBCH block in the PUSCH slot, starts at least Ngap symbols after a last SS/PBCH block symbol.

Ngap is provided in Table 8.1-2 in TS 38.213.

In one or more embodiments, the validation rule for CG-PUSCH for HD-FDD can be defined as follows:

For SS/PBCH blocks with indexes provided by ssb-PositionsInBurst in SIB1 or by ServingCellConfigCommon, the valid CG-PUSCH occasion does not precede a SS/PBCH block in the PUSCH slot, starts at least Ngap symbols after a last SS/PBCH block symbol.

Ngap is provided in Table 8.1-2 in TS 38.213.

Note that Ngap=0 symbols may be applied for HD-FDD UEs.

In one or more embodiments, for random access based SDT (RA-SDT), for subsequent data transmission, if PUSCH with repetition is scheduled for uplink transmission, PUSCH repetition can be counted based on available slot. In particular, in the first step of determination of available slot, only ssb-PositionsInBurst is considered for the determination of available slots. In this case, UE determines a slot as available slot when PUSCH repetition does not overlap with a symbol for SSB transmission indicated by ssb-PositionsInBurst. In another option, all slots are considered as available slots if PUSCH with repetitions are scheduled for uplink transmission for HD-FDD operations.

In one or more embodiments, for CG-SDT, if repetition is applied for CG-PUSCH transmission and subsequent PUSCH transmission or retransmission scheduled by a DCI, the PUSCH repetition can be counted based on available slot. In particular, in the first step of determination of available slot, only ssb-PositionsInBurst is considered for the determination of available slots. In this case, UE determines a slot as available slot when PUSCH repetition during CG-SDT does not overlap with a symbol for SSB transmission indicated by ssb-PositionsInBurst. In another option, all slots are considered as available slots for PUSCH repetitions for HD-FDD operations.

Physical Uplink Control Channel (PUCCH) Repetitions for HD-FDD Operations:

In 3GPP Rel-15/16, UE determines all slots as available slots for physical uplink control channel (PUCCH) repetitions for FDD system. Further, for TDD system, UE determines a slot as available slot when a PUCCH repetition does not overlap with DL symbols which are indicated by tdd-UL-DL-ConfigurationCommon or tdd-UL-DL-ConfigurationDedicated if provided, or a symbol of an SS/PBCH block with index provided by ssb-PositionsInBurst. However, for HD-FDD system, certain mechanism may need to be defined to determine the transmission of PUCCH repetitions for RedCap UEs.

Embodiments of PUCCH repetitions for HD-FDD operations are provided as follows:

In one or more embodiments, for a RedCap UE in HD-FDD operation, for PUCCH repetitions, UE determines a slot as an available slot for PUCCH repetitions when a PUCCH repetition does not overlap with a symbol with synchronization signal block (SSB) transmission indicated by ssb-PositionsInBurst.

The updated specification in Section 17.2 in TS38.213 is as follows:

A HD-UE determines the $$N_{PUCCH}^{repeat}$$

slots for a PUCCH transmission starting from a slot indicated to the UE as described in clause 9.2.3 for HARQ-ACK reporting, or a slot determined as described in clause 9.2.4 for SR reporting or in clause 5.2.1.4 of [6, TS 38.214] for CSI reporting, where a repetition of the PUCCH transmission does not include a symbol indicated as a symbol of an SS/PBCH block with index provided by ssb-PositionsInBurst.

Further, the updated specification in Section 9.2.6 in TS38.213 is as follows:

For paired spectrum or supplementary uplink band, the UE, except when it is a half-duplex UE, determines the $$N_{PUCCH}^{repeat}$$

slots for a PUCCH transmission as the $$N_{PUCCH}^{repeat}$$

consecutive slots starting from a slot indicated to the UE as described in clause 9.2.3 for HARQ-ACK reporting, or a slot determined as described in clause 9.2.4 for SR reporting or in clause 5.2.1.4 of [6, TS 38.214] for CSI reporting.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, in accordance with one or more example embodiments of the present disclosure.

Wireless network 100 may include one or more UEs 120 and one or more RANs 102 (e.g., gNBs), which may communicate in accordance with 3GPP communication standards. The UE(s) 120 may be mobile devices that are non-stationary (e.g., not having fixed locations) or may be stationary devices.

Figure 3:
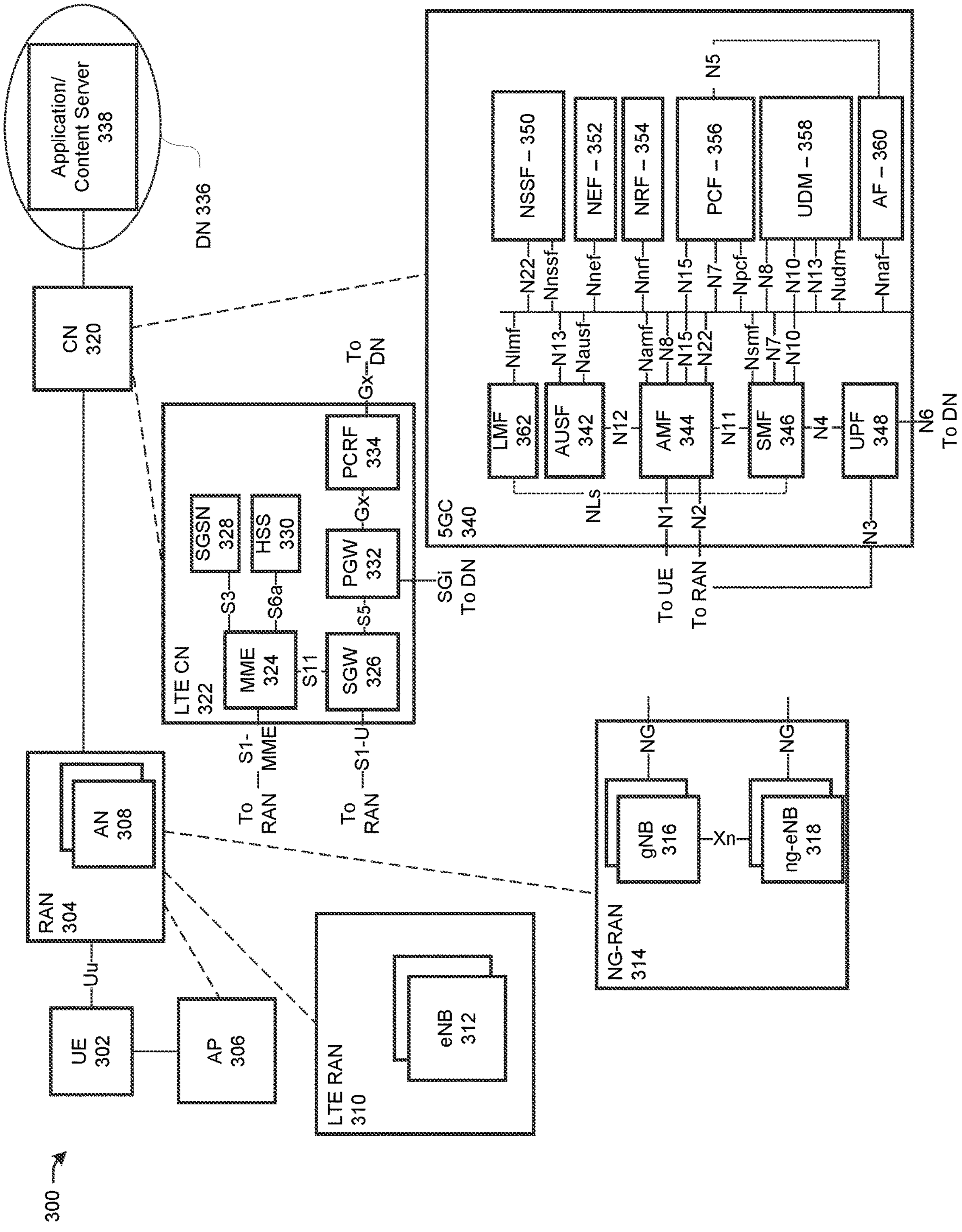
FIG. 3. illustrates a network, in accordance with one or more example embodiments of the present disclosure.
Figure 4:
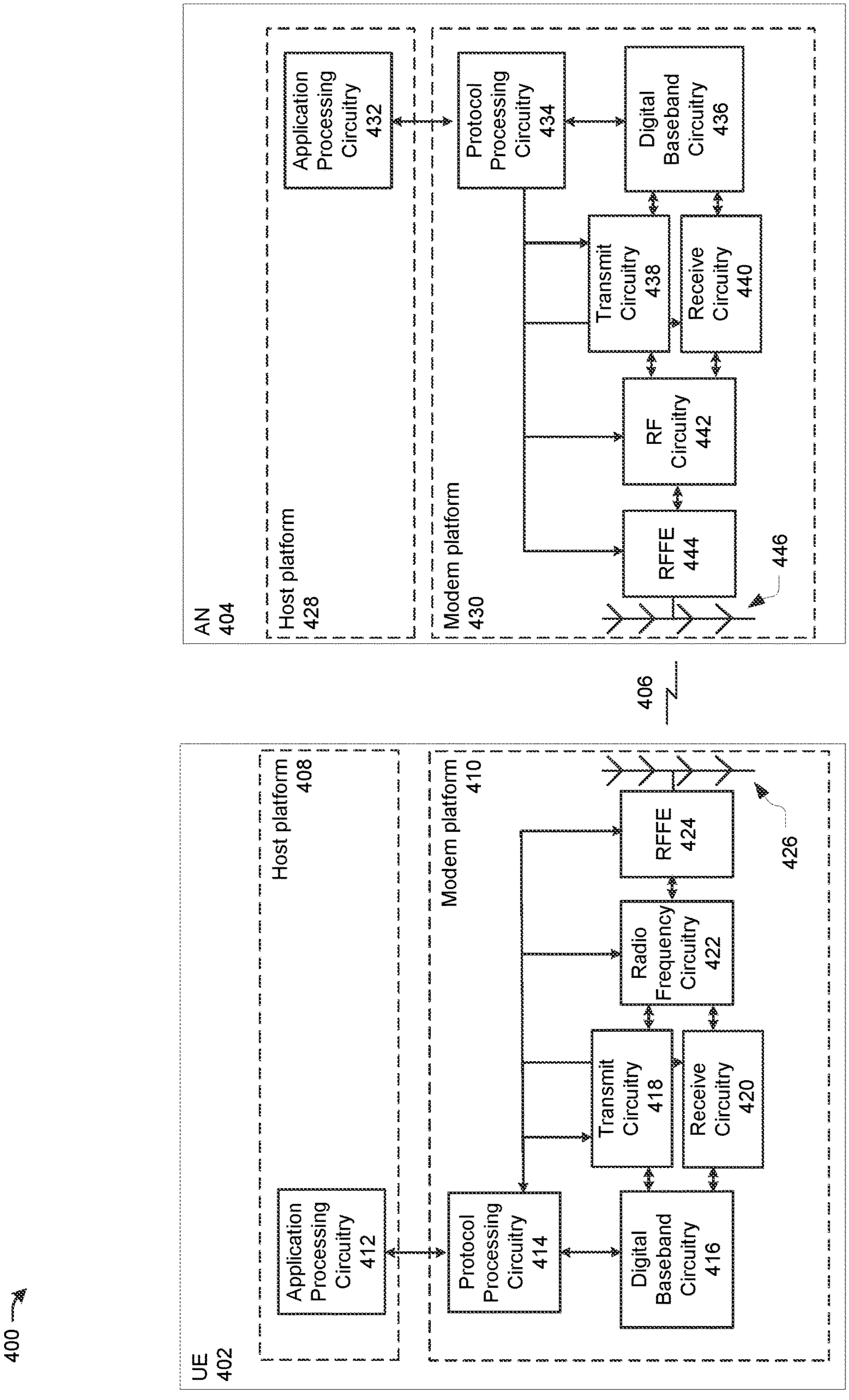
FIG. 4 schematically illustrates a wireless network, in accordance with one or more example embodiments of the present disclosure.
Figure 5:
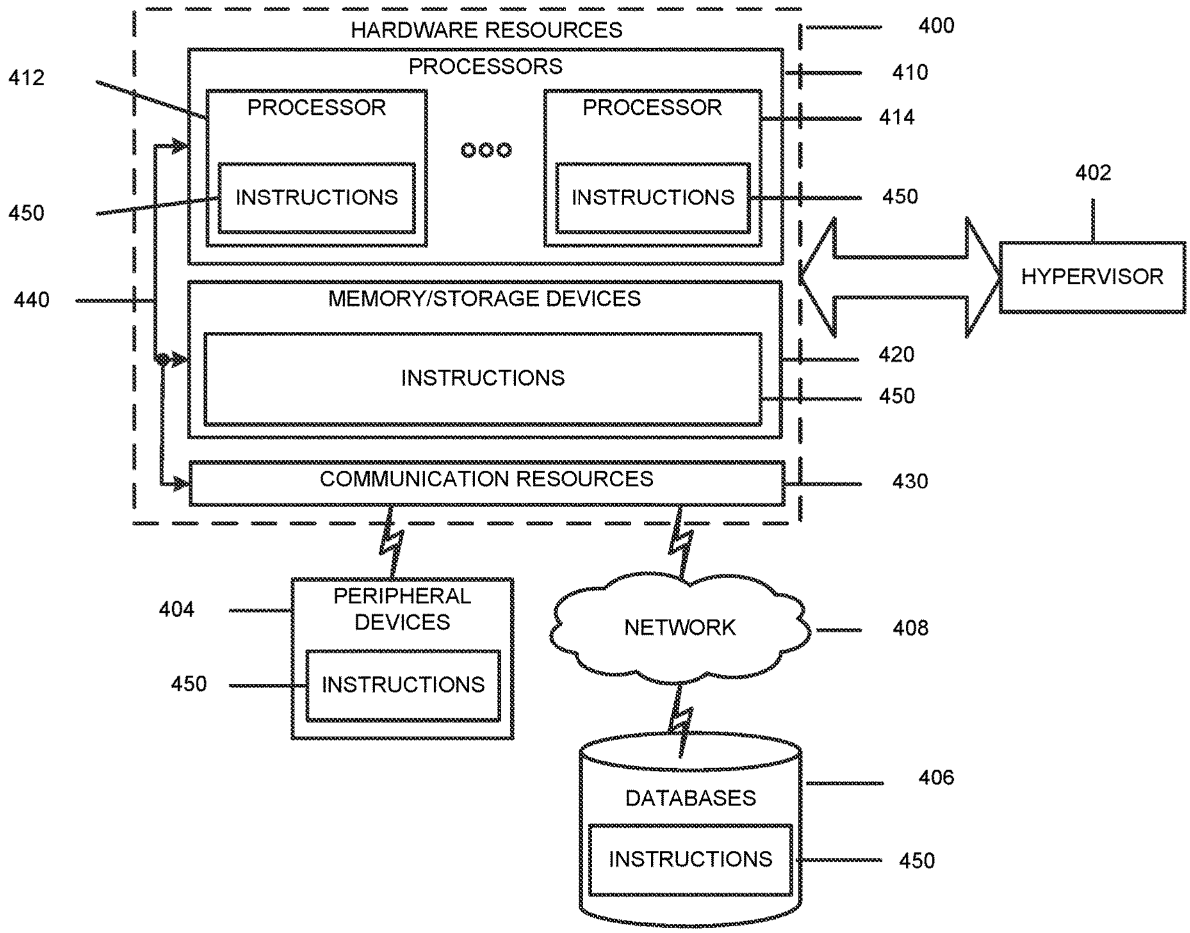
FIG. 5 is a block diagram illustrating components, in accordance with one or more example embodiments of the present disclosure.

In some embodiments, the UEs 120 and the RANs 102 may include one or more computer systems similar to that of FIGS. 3-5.

One or more illustrative UE(s) 120 and/or RAN(s) 102 may be operable by one or more user(s) 110. A UE may take on multiple distinct characteristics, each of which shape its function. For example, a single addressable unit might simultaneously be a portable UE, a quality-of-service (QoS) UE, a dependent UE, and a hidden UE. The UE(s) 120 (e.g., 124, 126, or 128) and/or RAN(s) 102 may include any suitable processor-driven device including, but not limited to, a mobile device or a non-mobile, e.g., a static device. For example, UE(s) 120 may include, a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the UE(s) 120 (e.g., UEs 124, 126, 128), and UE(s) 120 may be configured to communicate with each other via one or more communications networks 130 and/or 135 wirelessly or wired. The UE(s) 120 may also communicate peer-to-peer or directly with each other with or without the RAN(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, cellular networks. In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the UE(s) 120 (e.g., UE 124, 126, 128) and RAN(s) 102 may include one or more communications antennas. The one or more communications antennas may be any suitable type of antennas corresponding to the communications protocols used by the UE(s) 120 (e.g., UEs 124, 126 and 128), and RAN(s) 102. Some non-limiting examples of suitable communications antennas include cellular antennas, 3GPP family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the UEs 120 and/or RAN(s) 102.

Any of the UE(s) 120 (e.g., UE 124, 126, 128), and RAN(s) 102 may be configured to perform directional transmission and/or directional reception in conjunction with wirelessly communicating in a wireless network. Any of the UE(s) 120 (e.g., UE 124, 126, 128), and RAN(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the UE(s) 120 (e.g., UE 124, 126, 128), and RAN(s) 102 may be configured to perform any given directional transmission towards one or more defined transmit sectors. Any of the UE(s) 120 (e.g., UE 124, 126, 128), and RAN(s) 102 may be configured to perform any given directional reception from one or more defined receive sectors.

MIMO beamforming in a wireless network may be accomplished using RF beamforming and/or digital beamforming. In some embodiments, in performing a given MIMO transmission, UE 120 and/or RAN(s) 102 may be configured to use all or a subset of its one or more communications antennas to perform MIMO beamforming.

Any of the UE 120 (e.g., UE 124, 126, 128), and RAN(s) 102 may include any suitable radio and/or transceiver for transmitting and/or receiving radio frequency (RF) signals in the bandwidth and/or channels corresponding to the communications protocols utilized by any of the UE(s) 120 and RAN(s) 102 to communicate with each other. The radio components may include hardware and/or software to modulate and/or demodulate communications signals according to pre-established transmission protocols. The radio components may further have hardware and/or software instructions to communicate via one or more 3GPP protocols and using 3GPP bandwidths. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, one or more of the UE 120 may exchange frames 140 with the RANs 102. The frames 140 may messages for HD-FDD operations, such PUSCH and PUCCH repetitions, SSB transmissions, and the like as described in the present disclosure.

It is understood that the above descriptions are for purposes of illustration and are not meant to be limiting.

Figure 2:
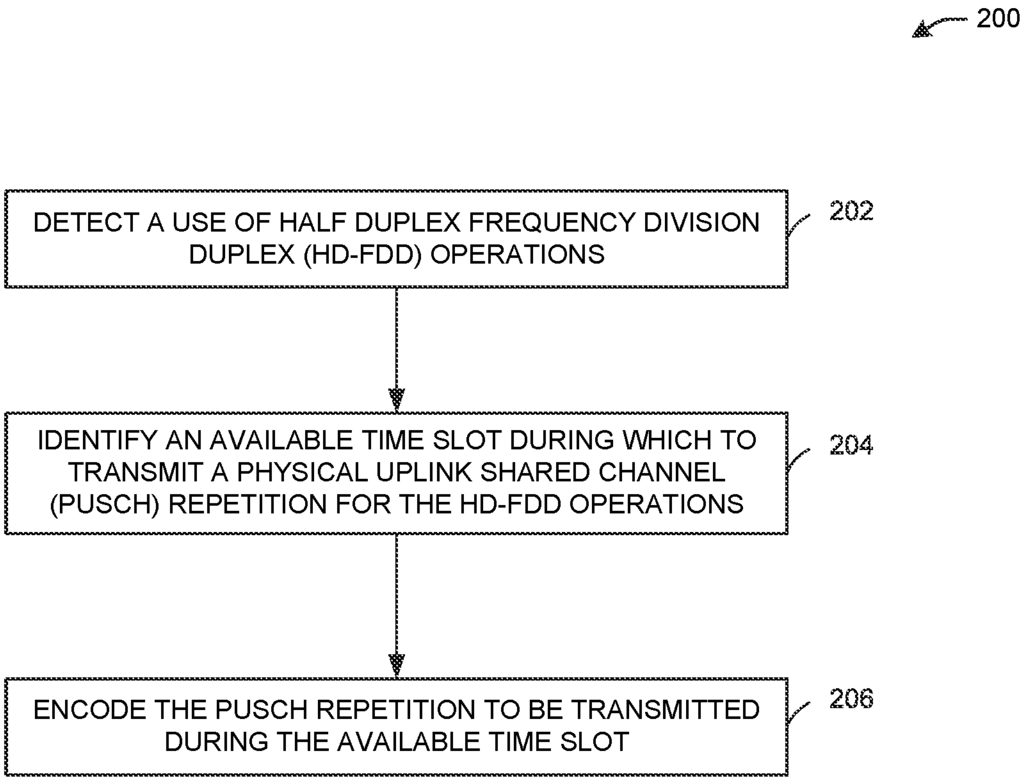
FIG. 2 illustrates a flow diagram of illustrative process for physical uplink shared channel (PUSCH) repetition for half duplex frequency division duplex (HD-FDD) wireless operations, in accordance with one or more example embodiments of the present disclosure.

FIG. 2 illustrates a flow diagram of illustrative process for physical uplink shared channel (PUSCH) repetition for half duplex frequency division duplex (HD-FDD) wireless operations, in accordance with one or more example embodiments of the present disclosure.

At block 202, a device (e.g., the UEs 120 of FIG. 1, the UE 302 of FIG. 1) may detect use of HD-FDD operations.

At block 204, the device may identify an available time slot during which to transmit a PUSCH repetition for the HD-FDD operations. Identifying the available time slot may be based on any of the techniques described in the present disclosure.

At block 206, the device may encode the PUSCH repetition to be transmitted during the available time slot.

These embodiments are not meant to be limiting.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be communicatively coupled with the RAN 304 by a Uu interface. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an S1 interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to L1 system); termination of SM parts of NAS messages; downlink data notification; initiating AN specific SM information, sent via AMF 344 over N2 to AN 308; and determining SSC mode of a session. SM may refer to management of a PDU session, and a PDU session or “session” may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350 may also determine allowed NSSAI and the mapping to the subscribed S-NSSAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms “instantiate,” “instantiation,” and the like may refer to the creation of an instance, and an “instance” may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities’ handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3$^{rd}$ party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHz frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

The following examples pertain to further embodiments.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Example 1 may include an apparatus of a user equipment device (UE) device for physical uplink shared channel (PUSCH) repetition for half duplex frequency division duplex (HD-FDD) wireless operations, the apparatus comprising processing circuitry coupled to storage for storing information associated with the HD-FDD operations, the processing circuitry configured to: detect a use of HD-FDD operations; identify an available time slot during which to transmit a PUSCH repetition for the HD-FDD operations; and encode the PUSCH repetition to be transmitted during the available time slot.

Example 2 may include the apparatus of example 1 and/or any other example herein, wherein the processing circuitry is further configured to: detect that a dynamic grant uplink transmission comprising the PUSCH repetition or a transport block processing over multiple slot (TBoMS) transmission or a physical uplink control channel (PUCCH) repetition does not start or end at least an amount of time from the last or the first symbols of a synchronization signal block (SSB); and identifying a slot that is not counted as an available slot for the PUSCH repetition and the TBoMS transmission.

Example 3 may include the apparatus of example 1 and/or any other example herein, wherein the processing circuitry is further configured to: detect that a configured grant uplink transmission comprising the PUSCH repetition or a transport block processing over multiple slot (TBoMS) transmission or a physical uplink control channel (PUCCH) repetition does not start or end at least an amount of time from the last or the first symbols of a synchronization signal block (SSB); and identifying a slot that is not counted as available slot for the PUSCH repetition and the TBoMS transmission.

Example 4 may include the apparatus of example 1 and/or any other example herein, wherein the processing circuitry is further configured to: detect available time slots for a dynamic grant PUSCH and for a configured grant PUSCH.

Example 5 may include the apparatus of example 1 and/or any other example herein, wherein to identify the available time slot is limited to a determination based on a SSB indicated by an SSB-PositionInBurst parameter.

Example 6 may include the apparatus of example 1 and/or any other example herein, wherein the processing circuitry is further configured to: detect that a gap between an end of a last-received downlink symbol and a start of a transmission of the PUSCH repetition is less than a time unit Tc; and detect a second time slot associated with the gap as unavailable for mapping the PUSCH repetition based on the gap being less than the time unit Tc.

Example 7 may include the apparatus of example 6 and/or any other example herein, wherein SSB is prioritized over a configured grant uplink transmission, and wherein to detect the second time slot as unavailable is further based on the SSB being prioritized over the configured grant uplink transmission when counting based on available time slots.

Example 8 may include the apparatus of example 1 and/or any other example herein, wherein the UE is a reduced capability UE configured with Type A PUSCH repetitions in which PUSCH repetitions are counted based on all time slots and PUSCH repetitions in unavailable time slots are dropped.

Example 9 may include the apparatus of example 1 and/or any other example herein, wherein the processing circuitry is further configured to: detect that a configured grant PUSCH occasion is invalid when the PUSCH occasion overlaps with a valid physical random access channel occasion for a configured grant small data transmission (SDT) procedure.

Example 10 may include the apparatus of example 1 and/or any other example herein, wherein the processing circuitry is further configured to: apply a FDD mapping rule for SSB to a configured grant PUSCH resource for the HD-FDD operations.

Example 11 may include the apparatus of example 1 and/or any other example herein, wherein the UE is a reduced capacity UE configured with a configured grant small data transmission (SDT) procedure, and is further configured to separate an initial downlink bandwidth part with at least PDCCH Type 1 common search space and an associated PDSCH mapped to the initial downlink bandwidth part, wherein a quasi co-location reference is based on a non-cell defining-SSB when the non-cell defining-SSB is configured in a the initial downlink bandwidth part.

Example 12 may include the apparatus of example 1 and/or any other example herein, wherein a configured grant PUSCH occasion is invalid when it overlaps with a MsgA PUSCH occasion for the HD-FDD operations.

Example 13 may include the apparatus of example 1 and/or any other example herein, wherein for a synchronization signal block (SSB) with indices provided by a SSB-PositionInBurst parameter, a valid configured grant PUSCH occasion does not precede the SSB in the available time slot and begins at least a number of symbols after a last SSB symbol.

Example 14 may include the apparatus of example 1 and/or any other example herein, wherein for a random access-based SDT operation, when the PUSCH repetition is scheduled for uplink transmission, the PUSCH repetition is counted based on the available time slot.

Example 15 may include the apparatus of example 1 and/or any other example herein, wherein for a configured grant SDT operation, when repetition is applied to a configured grant PUSCH transmission and a subsequent PUSCH transmission is scheduled by downlink control information, the PUSCH repetition is counted based on the available time slot.

Example 16 may include the apparatus of example 1 and/or any other example herein, wherein the UE is a reduced capacity UE, and wherein the processing circuitry is further configured to: detect a time slot as available for PUCCH repetitions when a PUCCH repetition does not overlap with a symbol of a SSB transmission as indicated by a SSB-PositionInBurst parameter.

Example 17 may include the apparatus of example 1 and/or any other example herein, wherein the UE is a reduced capacity UE, wherein for trigger-based processing over multiple time slots with and without repetitions, the processing circuitry is further configured to: detect a slot as available when a transport block over multiple slot (TBoMS) transmission begins or ends at least $N_{Rx-Tx} \cdot T_c$ from a last or first symbol in a SSB transmission and does not overlap with the SSB transmission.

Example 18 may include the apparatus of example 1 and/or any other example herein, wherein for a PUSCH repetition Type A with counting based on available time slots, when the UE is a reduced capacity UE, the processing circuitry is further configured to: detect the available time slot when the PUSCH repetition begins or ends at least $N_{Rx-Tx} \cdot T_c$ from a last or first symbol in a SSB transmission and does not overlap with the SSB transmission.

Example 19 may include a computer-readable storage medium comprising instructions to cause processing circuitry of a user equipment device (UE) for physical uplink shared channel (PUSCH) repetition for half duplex frequency division duplex (HD-FDD) wireless operations, upon execution of the instructions by the processing circuitry, to: detect a use of HD-FDD operations; identify an available time slot during which to transmit a PUSCH repetition for the HD-FDD operations; and encode the PUSCH repetition to be transmitted during the available time slot.

Example 20 may include the computer-readable medium of example 19 and/or any other example herein, wherein a configured grant PUSCH occasion is invalid when it overlaps with a MsgA PUSCH occasion for the HD-FDD operations.

Example 21 may include the computer-readable medium of example 19 and/or any other example herein, wherein the UE is a reduced capacity UE, and wherein for trigger-based processing over multiple time slots with and without repetitions, execution of the instructions further causes the processing circuitry to: detect a time slot as available when a transport block over multiple slot (TBoMS) transmission begins or ends at least $N_{Rx-Tx} \cdot T_c$ from a last or first symbol in a SSB transmission and does not overlap with the SSB transmission.

Example 22 may include the computer-readable medium of example 19 and/or any other example herein, wherein for a PUSCH repetition Type A with counting based on available time slots, when the UE is a reduced capacity UE, execution of the instructions further causes the processing circuitry to: detect the available time slot when the PUSCH repetition begins or ends at least $N_{Rx-Tx} \cdot T_c$ from a last or first symbol in a SSB transmission and does not overlap with the SSB transmission.

Example 23 may include a method for physical uplink shared channel (PUSCH) repetition for half duplex frequency division duplex (HD-FDD) wireless operations, the method comprising: detecting, by processing circuitry of a user equipment device (UE), a use of HD-FDD operations; identifying, by the processing circuitry, an available time slot during which to transmit a PUSCH repetition for the HD-FDD operations; and encoding, by the processing circuitry, the PUSCH repetition to be transmitted during the available time slot.

Example 24 may include a computer-readable storage medium comprising instructions to perform the method of example 23.

Example 25 may include an apparatus comprising means for performing the method of example 23.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019-06) and/or any other 3GPP standard. For the purposes of the present document, the following abbreviations (shown in Table 1) may apply to the examples and embodiments discussed herein.

TABLE 2

| Abbreviations | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |

TABLE 2-continued

| Abbreviations | |
|---|---|
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |

TABLE 2-continued

| Abbreviations | |
|---|---|
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |

TABLE 2-continued

| Abbreviations | |
|---|---|
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |

TABLE 2-continued

| Abbreviations | |
|---|---|
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |

TABLE 2-continued

| Abbreviations | |
|---|---|
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |

TABLE 2-continued

| Abbreviations | |
|---|---|
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |

TABLE 2-continued

| Abbreviations | |
|---|---|
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

What is claimed is:

1. An apparatus of a user equipment device (UE) device for physical uplink shared channel (PUSCH) repetition for half duplex (HD) wireless operations, the apparatus comprising processing circuitry coupled to storage for storing information associated with the HD operations, the processing circuitry configured to:

detect a repetition of a PUSCH transmission to be performed using HD operations; identify, based on analysis of slot time overlap between the PUSCH transmission and downlink symbols or flexible symbols and a determination that a gap between an end of a last received downlink symbol and a start of the repetition is at least a time unit T scaled by a factor, an available slot time during which to transmit the repetition; and encode the repetition to be transmitted during the available time slot.

2. The apparatus of claim 1, wherein to identify the available slot time is based on transport block processing over multiple slots (TBoMS).

3. The apparatus of claim 1, wherein the repetition is a PUSCH repetition Type A instead of a PUSCH repetition Type B.

4. The apparatus of claim 1, wherein the processing circuitry is further configured to identify a slot time that is not counted as available for the repetition.

5. The apparatus of claim 1, wherein symbols of the PUSCH transmission are based on a resource allocation table, and wherein the available slot time is based on at least one of the symbols indicated by an indexed row of the used resource allocation table.

6. The apparatus of claim 1, wherein symbols of the PUSCH transmission are repeated using a same symbol allocation in the available slot time and in a second available slot time.

7. The apparatus of claim 1, wherein to identify the available slot time is based on symbols of the PUSCH transmission not overlapping with a symbol of a synchronization signal (SS) or of a physical broadcast channel (PBCH) block.

8. A computer-readable medium storing computer-executable instructions for physical uplink shared channel (PUSCH) repetition for half duplex (HD) wireless operations, which when executed by one or more processors result in performing operations comprising:

detecting a repetition of a PUSCH transmission to be performed using HD operations; identifying, based on analysis of slot time overlap between the PUSCH transmission and downlink symbols or flexible symbols and a determination that a gap between an end of a last received downlink symbol and a start of the repetition is at least a time unit scaled by a factor, an available slot time during which to transmit the repetition; and encoding the repetition to be transmitted during the available time slot.

9. The computer-readable medium of claim 8, wherein identifying the available slot time is based on transport block processing over multiple slots (TBoMS).

10. The computer-readable medium of claim 8, wherein the repetition is a PUSCH repetition Type A instead of a PUSCH repetition Type B.

11. The computer-readable medium of claim 8, the operations further comprising identifying a slot time that is not counted as available for the repetition.

12. The computer-readable medium of claim 8, wherein symbols of the PUSCH transmission are based on a resource allocation table, and wherein the available slot time is based on at least one of the symbols indicated by an indexed row of the used resource allocation table.

13. The computer-readable medium of claim 8, wherein symbols of the PUSCH transmission are repeated using a same symbol allocation in the available slot time and in a second available slot time.

14. The computer-readable medium of claim 8, wherein identifying the available slot time is based on symbols of the PUSCH transmission not overlapping with a symbol of a synchronization signal (SS) or of a physical broadcast channel (PBCH) block.

15. A method for physical uplink shared channel (PUSCH) repetition for half duplex (HD) wireless operations, the method comprising:

detecting, by processing circuitry of a user equipment (UE), a repetition of a PUSCH transmission to be performed using HD operations;

identifying, by the processing circuitry, based on analysis of slot time overlap between the PUSCH transmission and downlink symbols or flexible symbols and a determination that a gap between an end of a last received downlink symbol and a start of the repetition is at least a time unit scaled by a factor, an available slot time during which to transmit the repetition; and encoding, by the processing circuitry, the repetition to be transmitted during the available time slot.

16. The method of claim 15, wherein identifying the available slot time is based on transport block processing over multiple slots (TBoMS).

17. The method of claim 15, wherein the repetition is a PUSCH repetition Type A instead of a PUSCH repetition Type B.

18. The method of claim 15, further comprising identifying a slot time that is not counted as available for the repetition.

19. The method of claim 15, wherein symbols of the PUSCH transmission are based on a resource allocation table, and wherein the available slot time is based on at least one of the symbols indicated by an indexed row of the used resource allocation table.

20. The method claim 15, wherein symbols of the PUSCH transmission are repeated using a same symbol allocation in the available slot time and in a second available slot time.

* * * * *